United States Patent
Liu et al.

(10) Patent No.: US 10,447,699 B2
(45) Date of Patent: Oct. 15, 2019

(54) METHOD AND SYSTEM FOR FACILITATING WIRELESS NETWORK ACCESS

(71) Applicant: TENCENT TECHNOLOGY (SHENZHEN) COMPANY LIMITED, Shenzhen, Guangdong (CN)

(72) Inventors: Jinhai Liu, Shenzhen (CN); Xiangyao Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 578 days.

(21) Appl. No.: 15/014,355

(22) Filed: Feb. 3, 2016

(65) Prior Publication Data

US 2016/0156635 A1 Jun. 2, 2016

Related U.S. Application Data

(63) Continuation of application No. PCT/CN2015/070405, filed on Jan. 9, 2015.

(30) Foreign Application Priority Data

Feb. 26, 2014 (CN) .......................... 2014 1 0067279

(51) Int. Cl.
*H04L 29/06* (2006.01)
*H04W 4/50* (2018.01)
(Continued)

(52) U.S. Cl.
CPC ........ *H04L 63/102* (2013.01); *H04L 63/0815* (2013.01); *H04W 4/02* (2013.01); *H04W 4/50* (2018.02); *H04W 12/06* (2013.01)

(58) Field of Classification Search
CPC combination set(s) only.
See application file for complete search history.

(56) References Cited

U.S. PATENT DOCUMENTS 6,269,395 B1 * 7/2001 Blatherwick ........... G06F 16/25
709/219
7,136,846 B2 * 11/2006 Chang ................. G06F 16/9577
(Continued)

FOREIGN PATENT DOCUMENTS

CN 102711057 A 10/2012
CN 102932793 A 2/2013
(Continued)

OTHER PUBLICATIONS

International Search Report dated Apr. 17, 2015, in corresponding International Application No. PCT/CN2015/070405.
(Continued)

*Primary Examiner* — Uzma Alam
(74) *Attorney, Agent, or Firm* — Anova Law Group, PLLC

(57) ABSTRACT

Methods and systems for facilitating access to a network (e.g., the Internet) are disclosed herein. A server with processor(s) and memory receives a request from a client device to download a network access configuration file, where the network access configuration file is configured to enable access to the Internet via a respective Internet access point. In accordance with the received request, the server identifies a first account in a social networking platform corresponding to a provider of the respective Internet access point. The server determines a relationship between the first account and a second account corresponding to a user of the client device in the social networking platform. In accordance with a first determination that the relationship satisfies one or more predetermined access criteria, the server pro-
(Continued)

vides the network access configuration file to the client device.

20 Claims, 13 Drawing Sheets

(51) Int. Cl.
*H04W 12/06* (2009.01)
*H04W 4/02* (2018.01)

(56) References Cited

U.S. PATENT DOCUMENTS

| | | | | |
|---|---|---|---|---|
| 7,496,652 | B2* | 2/2009 | Pezzutti | H04L 41/065 709/217 |
| 7,792,538 | B2* | 9/2010 | Kozisek | H04W 12/06 370/310 |
| 7,814,157 | B2* | 10/2010 | Doyle | G06F 9/45508 370/389 |
| 7,856,659 | B2* | 12/2010 | Keeler | G06Q 20/206 726/12 |
| 8,339,991 | B2* | 12/2012 | Biswas | H04L 41/04 370/254 |
| 8,407,345 | B2* | 3/2013 | Lim | G06F 9/468 709/225 |
| 8,667,009 | B2* | 3/2014 | Voigt | H04L 51/32 707/769 |
| 8,700,033 | B2* | 4/2014 | Hinton | H04W 12/0602 455/432.1 |
| 9,003,531 | B2* | 4/2015 | Nazarov | G06F 21/562 713/188 |
| 9,253,200 | B2* | 2/2016 | Schwarz | G06F 3/0484 |
| 9,386,511 | B2* | 7/2016 | Kim | H04W 48/16 |
| 9,467,818 | B2* | 10/2016 | O'Brien | H04W 4/06 |
| 9,479,488 | B2* | 10/2016 | Tseng | H04L 63/102 |
| 9,479,987 | B2* | 10/2016 | Vissa | H04W 36/26 |
| 9,628,484 | B2* | 4/2017 | Perrone, II | H04L 63/0892 |
| 9,686,819 | B2* | 6/2017 | Fan | H04W 12/04 |
| 9,729,667 | B2* | 8/2017 | LeBeau | H04L 67/306 |
| 9,774,705 | B2* | 9/2017 | Li | G06F 16/95 |
| 9,853,980 | B2* | 12/2017 | Radier | H04W 12/04 |
| 9,912,438 | B2* | 3/2018 | Yerramalli | H04L 1/0009 |
| 9,912,482 | B2* | 3/2018 | Burbank | H04L 63/0414 |
| 9,912,629 | B2* | 3/2018 | Forsman | H04W 12/06 |
| 9,944,985 | B2* | 4/2018 | Sadhasivam | C12Q 1/6883 |
| 9,949,127 | B1* | 4/2018 | Tas | H04W 12/08 |
| 2012/0254614 | A1* | 10/2012 | Kimura | H04W 12/04 713/168 |
| 2013/0185426 | A1* | 7/2013 | Chevillat | G06Q 10/10 709/225 |
| 2013/0198383 | A1* | 8/2013 | Tseng | H04L 63/102 709/225 |

FOREIGN PATENT DOCUMENTS

| | | |
|---|---|---|
| CN | 102984139 A | 3/2013 |
| CN | 103442356 A | 12/2013 |
| CN | 103442411 A | 12/2013 |
| CN | 103532971 A | 1/2014 |
| KR | 20120129249 A | 11/2012 |
| WO | 2012131488 A1 | 10/2012 |

OTHER PUBLICATIONS

Extended European Search Report dated Jul. 20, 2017, in corresponding European Patent Application No. 15754970.0.
The World Intellectual Property Organization (WIPO) International Search Report for PCT/CN2015/070405 dated Apr. 17, 2015 3 Pages.
The State Intellectual Property Office of the People's Republic of China (SIPO) Office Action 1 for 201410067279.5 dated May 5, 2015 7 Pages (including translation).
Xiaofeng Liu, "A authentication mechanism based on two-dimension code and asymmetric encryption algorithm"; "Heilongjiang Science and Technology Information" No. 17; Jun. 30, 2013 (Jun. 30, 2013). 3 Pages (including abstract translation).
Zhe Han. "Design and Implementation of Two-dimensional Code Network Attendance System Based on the Android Platform"; "Journal of Anhui Science and Technology University", No. 5; May 31, 2013 (May 31, 2013). 4 Pages.

* cited by examiner

METHOD AND SYSTEM FOR FACILITATING WIRELESS NETWORK ACCESS

PRIORITY CLAIM AND RELATED APPLICATION

The present application is a U.S. continuation application under 35 U.S.C. § 111(a) claiming priority under 35 U.S.C. §§ 120 and 365(c) to International Application PCT/CN2015/070405, filed Jun. 9, 2015, and claims foreign priority to Chinese application 201410067279.5, entitled "Method and Related Apparatus and System for Wireless Access", filed on Feb. 26, 2014, which is incorporated by reference in its entirety.

FIELD

The present disclosure relates to the field of Internet technologies, and in particular, to a method and system for facilitating access to the Internet.

BACKGROUND

Currently, graphic codes (e.g., QR codes) for following different social application accounts are usually published in different public places, such as hotels, restaurants, markets, and the like, so that a user may follow the social application accounts through social applications to obtain the newest information issued by the social application accounts. Furthermore, wireless access points (such as Wi-Fi hotspots) are usually arranged in the public places, such as the hotels, restaurants, markets, and the like, so that the user may access the Internet via the wireless access points. However, in practical use, when needing to access a wireless access point in a public place, the user generally needs to ask service staff for a password and manually input the password to access the Internet via the access point. Obviously, the efficiency of wireless access is reduced by having to ask for and manually input the password.

SUMMARY

In some embodiments, a method of facilitating access to a network (e.g., the Internet) is performed at a server with one or more processors and memory. The method includes receiving a request from a client device to download a network access configuration file, where the network access configuration file is configured to enable access to the Internet via a respective Internet access point. In accordance with the received request, the method includes identifying a first account in a social networking platform corresponding to a provider of the respective Internet access point. The method includes determining a relationship between the first account and a second account corresponding to a user of the client device in the social networking platform. In accordance with a first determination that the relationship satisfies one or more predetermined access criteria, the method includes providing the network access configuration file to the client device.

In some embodiments, a computing device includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computing device with one or more processors, cause the computing device to perform, or control performance of, the operations of any of the methods described herein. In some embodiments, a computing device includes means for performing, or controlling performance of, the operations of any of the methods described herein.

Various advantages of the present application are apparent in light of the descriptions below.

BRIEF DESCRIPTION OF DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

Like reference numerals refer to corresponding parts throughout the several views of the drawings.

DETAILED DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
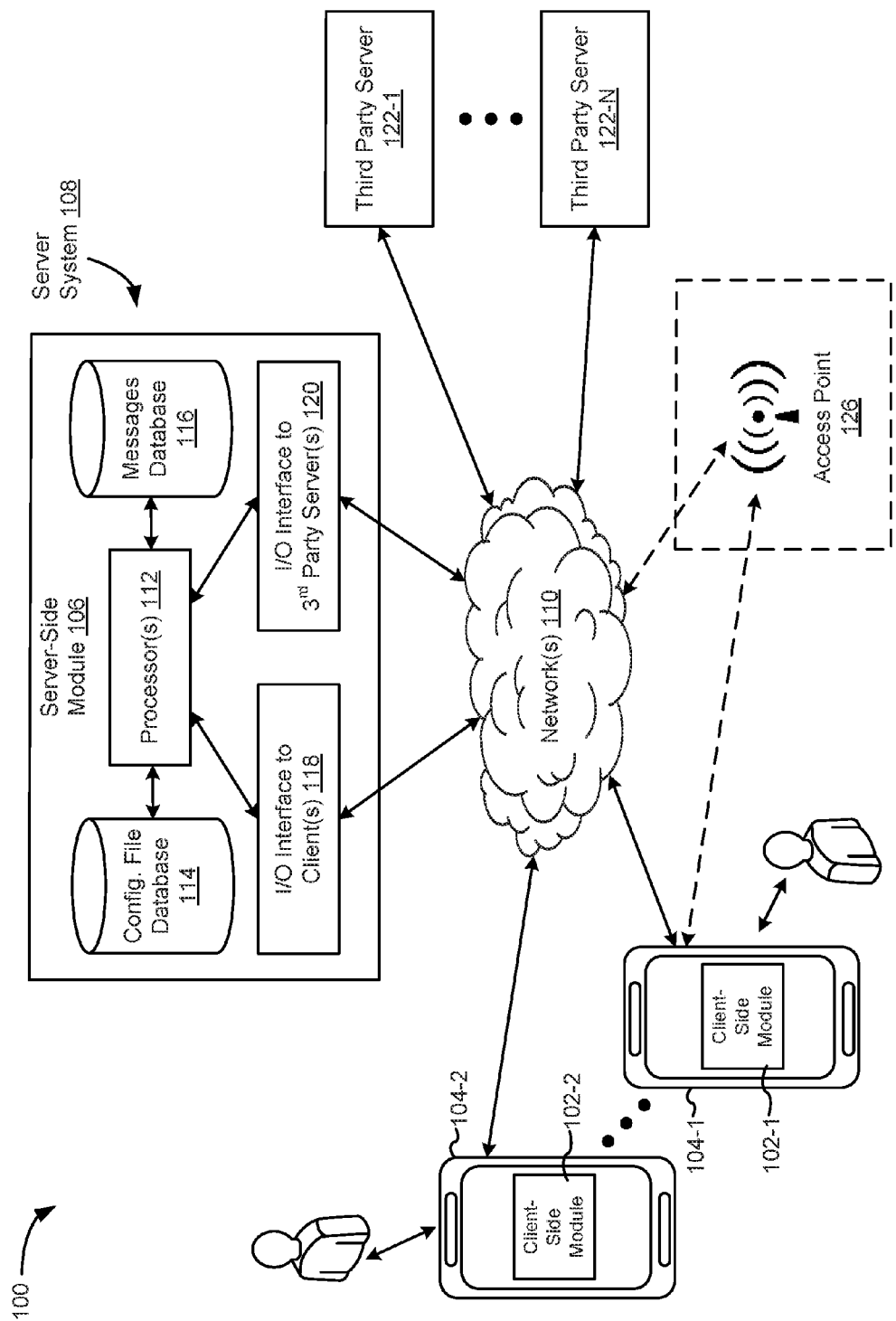
FIG. 1 is a block diagram of a server-client environment in accordance with some embodiments.

As shown in FIG. 1, data processing for a social networking platform is implemented in a server-client environment 100 in accordance with some embodiments. In accordance with some embodiments, server-client environment 100 includes client-side processing 102-1, 102-2 (hereinafter "client-side modules 102") executed on a client device 104-1, 104-2, and server-side processing 106 (hereinafter "server-side module 106") executed on a server system 108. Client-side module 102 communicates with server-side module 106 through one or more networks 110. Client-side module 102 provides client-side functionalities for the social networking platform and communications with server-side module 106. Server-side module 106 provides server-side functionalities for the social networking platform for any number of client modules 102 each residing on a respective client device 104.

In some embodiments, server-side module 106 includes one or more processors 112, configuration file database 114, messages database 116, an I/O interface to one or more clients 118, and an I/O interface to one or more third-party servers 120. I/O interface to one or more clients 118 facilitates the client-facing input and output processing for server-side module 106. In some embodiments, processor(s) 112 process requests for Internet access via an access point based on a relationship in the social networking platform between a first account corresponding to the provider of the access point and a second account corresponding to the requestor. Configuration file database 114 stores one or more network access configuration file configured to enable access to the Internet via respective Internet access points, and messages database 116 stores messages sent by users in the social networking platform. I/O interface to one or more third-party servers 120 facilitates communications with one or more third-party servers 122 (e.g., online or in-person retailers, banking services, online shopping services, account settlement services, application hosting, web hosting, or cloud-based services such as video and/or image hosting and storage websites).

In some embodiments, one or more third-party servers 122 are each associated with a public account in the social networking platform and some of one or more third-party servers 122 provide access points to the Internet at specified physical locations. For example, a respective third-party server 122 is associated with a coffee provider and provides an access point 126 in its physical coffee shop. Continuing with this example, access point 126 may be used to access the Internet by scanning a graphic code displayed at a location in the coffee shop or by selecting an affordance associated with Internet access on their public account page within the social networking platform.

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an eBook reader, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108. In some embodiments, server system 108 includes, but is not limited to, a handheld computer, a tablet computer, a laptop computer, a desktop computer, or a combination of any two or more of these data processing devices or other data processing devices.

Server-client environment 100 shown in FIG. 1 includes both a client-side portion (e.g., client-side module 102) and a server-side portion (e.g., server-side module 106). In some embodiments, data processing is implemented as a stand-alone application installed on client device 104. In addition, the division of functionalities between the client and server portions of client-server environment 100 can vary in different embodiments. For example, in some embodiments, client-side module 102 is a thin-client that provides only user-facing input and output processing functions, and delegates all other data processing functionalities to a backend server (e.g., server system 108). Although many aspects of the present technology are described from the perspective of server system 108, the corresponding actions performed by client device 104 would be apparent to ones skilled in the art without any creative efforts. Furthermore, some aspects of the present technology may be performed by server system 108, client device 104, or server system 108 and client device 104 cooperatively.

Figure 2:
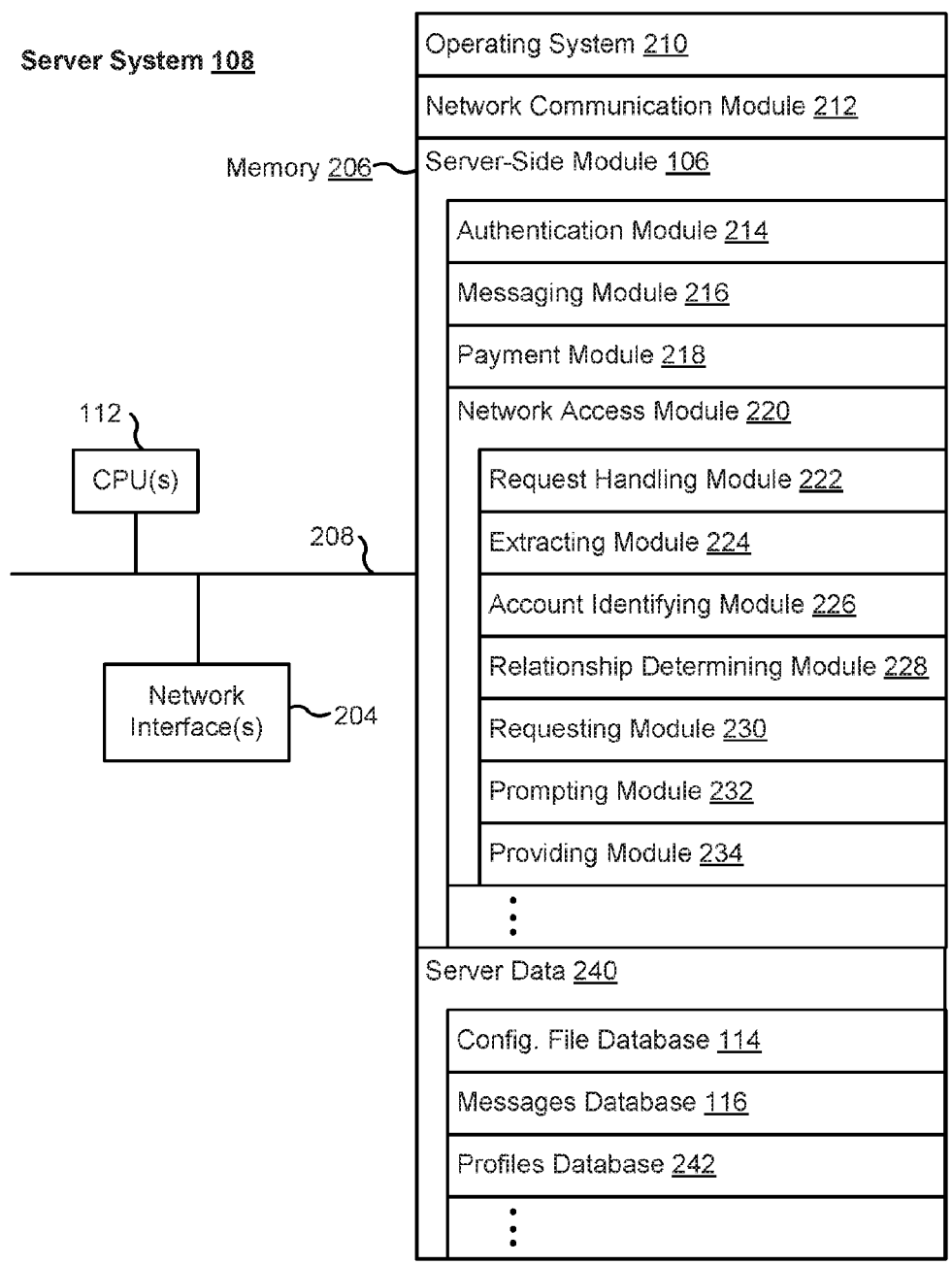
FIG. 2 is a block diagram of a server system in accordance with some embodiments.

FIG. 2 is a block diagram illustrating server system 108 in accordance with some embodiments. Server system 108, typically, includes one or more processing units (CPUs) 112, one or more network interfaces 204 (e.g., including I/O interface to one or more clients 118 and I/O interface one or more third-party servers 120), memory 206, and one or more communication buses 208 for interconnecting these components (sometimes called a chipset). Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- operating system 210 including procedures for handling various basic system services and for performing hardware dependent tasks;
- network communication module 212 for connecting server system 108 to other computing devices (e.g., client devices 104 and one or more third-party servers 122) connected to one or more networks 110 via one or more network interfaces 204 (wired or wireless);
- server-side module 106, which provides server-side data processing and functionalities for the social networking platform, including but not limited to:
  - authentication module 214 for performing an authentication process to validate a user account to access the social networking platform;
  - messaging module 216 for managing and routing messages sent between users of the social networking platform;
  - (optional) payment module 218 for processing transactions for a respective user of the social networking platform based on payment data in a user profile in profiles database 242 corresponding to the respective use;
  - network access module 220 for facilitating access to the Internet, including but not limited to:
    - request handling module 222 for receiving a request from a respective client device 104 to download a network access configuration file, where the network access configuration file is configured to enable access to the Internet via a respective Internet access point;
    - (optional) extracting module 224 for extracting a character string from an image of a graphic code received from respective client device 104, where the character string includes the first account and an identifier corresponding to the respective Internet access point from the two-dimensional code;
    - account identifying module 226 for identifying a first account in the social networking platform corresponding to a provider of the respective Internet access point;
    - relationship determining module 228 for determining a relationship between the first account and a second account corresponding to a user of respective client device 104 in the social networking platform;
    - requesting module 230 for requesting the network access configuration file from a third-party server 122 corresponding to the first account identified by account identifying module 226;
    - prompting module 232 for prompting the user of client device 104 to perform at least one predetermined action within the social networking platform in accordance with a determination that the relationship does not satisfy the one or more predetermined access criteria; and
    - providing module 234 for providing the network access configuration file to respective client device 104 in accordance with a first determination that the relationship satisfies one or more predetermined access criteria; and
- server data 240 storing data for the social networking platform, including but not limited to:
  - configuration file database 114 storing one or more network access configuration file configured to enable access to the Internet via respective Internet access points;
  - messages database 116 storing messages sent by users in the social networking platform; and
  - profiles database 242 storing user profiles for users of the social networking platform, where a respective user profile for a user includes a user identifier (e.g., an account name or handle), login credentials to the social networking platform, (optionally) payment data (e.g., linked credit card information, app credit or gift card balance, billing address, shipping address, etc.), an IP address or preferred contact information, group chat(s) subscribed to, contacts list (i.e., followed public and private accounts), custom parameters for the user (e.g., age, location, hobbies, etc.), and identified trends and/or likes/dislikes of the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
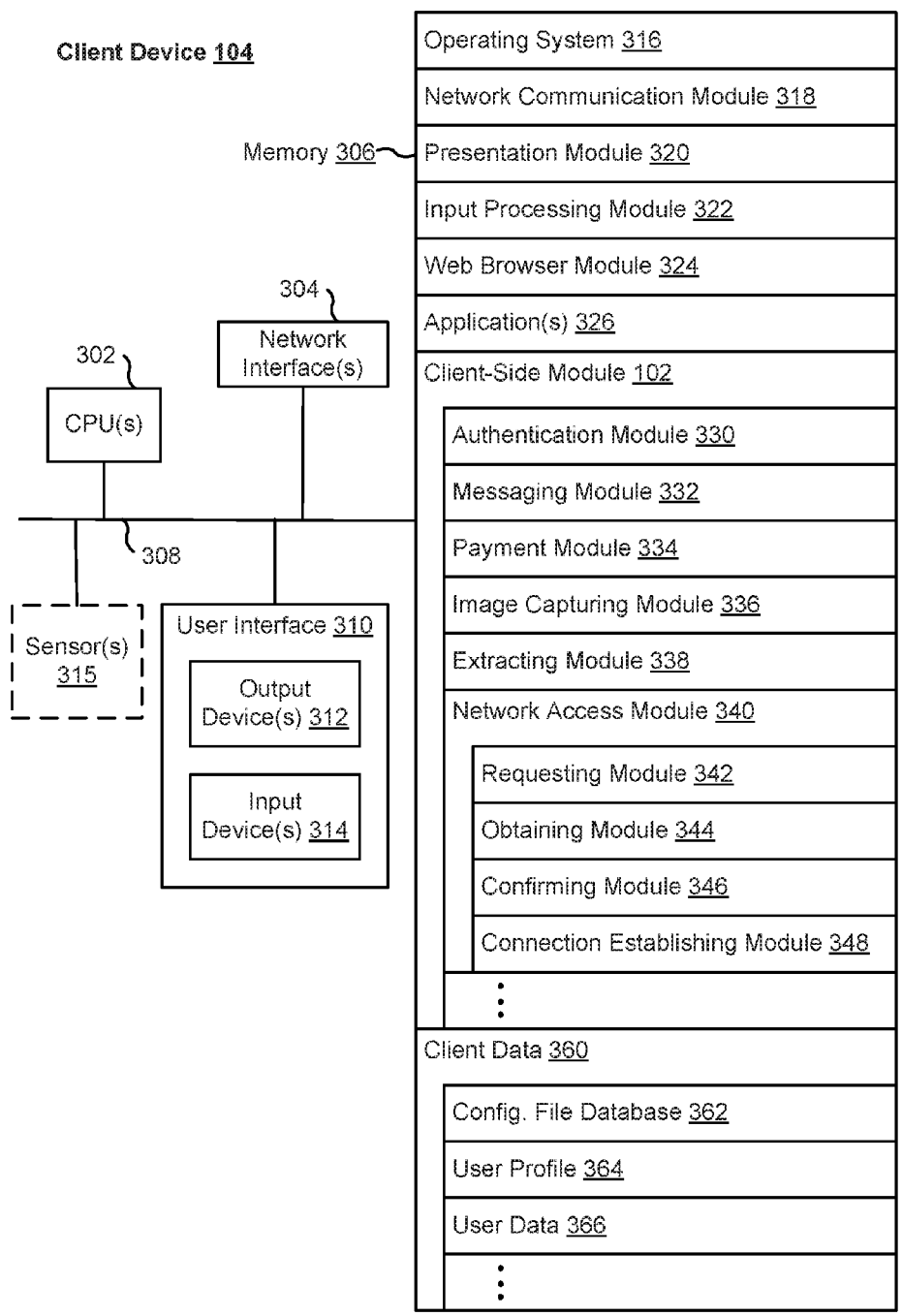
FIG. 3 is a block diagram of a client device in accordance with some embodiments.

FIG. 3 is a block diagram illustrating a representative client device 104 associated with a user (e.g., a merchant, or a user requesting payment) in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a gesture capturing camera, or other input buttons or controls. Furthermore, some client devices 104 use a microphone and voice recognition or a camera and gesture recognition to supplement or replace the keyboard. In some embodiments, client device 104 optionally includes one or more sensors 315, which provide context information as to the current state of client device 104 or the environmental conditions associated with client device 104. Sensor(s) 315 include but are not limited to one or more microphones, one or more cameras, an ambient light sensor, one or more accelerometers, one or more gyroscopes, a GPS positioning system, other location system, a Bluetooth or Bluetooth Low Energy (BLE) system, a temperature sensor, one or more motion sensors, one or more biological sensors (e.g., a galvanic skin resistance sensor, a pulse oximeter, and the like), and other sensors.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- operating system 316 including procedures for handling various basic system services and for performing hardware dependent tasks;
- network communication module 318 for connecting client device 104 to other computing devices (e.g., server system 108 and one or more third-party servers 122) connected to one or more networks 110 via one or more network interfaces 304 (wired or wireless);
- presentation module 320 for enabling presentation of information (e.g., a user interface for application(s) 326 or the social networking platform, widgets, websites and web pages thereof, and/or games, audio and/or video content, text, etc.) at client device 104 via one or more output devices 312 (e.g., displays, speakers, etc.) associated with user interface 310;
- input processing module 322 for detecting one or more user inputs or interactions from one of the one or more input devices 314 and interpreting the detected input or interaction;
- web browser module 324 for navigating, requesting (e.g., via HTTP), and displaying websites and web pages thereof;
- one or more applications 326 for execution by client device 104 (e.g., games, application marketplaces, payment platforms, and/or other web or non-web based applications);
- client-side module 102, which provides client-side data processing and functionalities for the social networking platform, including but not limited to:
  - authentication module 330 for authenticating the user of client device 104 to access his/her respective user account in the social networking platform;
  - messaging module 332 for sending messages to and receiving messages from other users of the social networking platform (e.g., instant messaging, group chat, message board, message/news feed, and the like);
  - (optional) payment module 334 for processing payments associated with transactions initiated within the social networking platform or at a merchant's website within web browser module 324;
  - image capturing module 336 for capturing images;
  - extracting module 338 for extracting character strings from graphic codes within images captured by image capturing module 336; and
  - network access module 340 for facilitating access to the Internet, including but not limited to:
    - requesting module 342 for sending a request, to server system 108, to download a network access configuration file, where the network access configuration file is configured to enable access to the Internet via a respective Internet access point (e.g., the request includes an image of a graphic code captured by image capturing module 336 or the character string extracted by extracting module 338 from the graphic code in the captured image);
    - obtaining module 344 for obtaining the network access configuration file from server system 108;
    - confirming module 346 for confirming that the user of client device 104 wishes to access the respective Internet access point associated with the network access configuration file; and
    - connection establishing module 348 for establishing a connection to the Internet via the respective Internet access point; and
- client data 360 storing data associated with the social networking platform, including, but is not limited to:
  - configuration file database 362 storing one or more network access configuration file configured to enable access to the Internet via respective Internet access points;
  - user profile 364 storing a user profile for the user of client device 104, including, but not limited to, a user identifier (e.g., an account name or handle), login credentials to the social networking platform, (optionally) payment data (e.g., linked credit card information, app credit or gift card balance, billing address, shipping address, etc.), an IP address or preferred contact information, group chat(s) subscribed to, contacts list (i.e., followed public and private accounts), custom parameters for the user (e.g., age, location, hobbies, etc.), and identified trends and/or likes/dislikes of the user; and
  - user data 366 storing data authored, saved, liked, or chosen as favorites by the user of client device 104 in the social networking platform.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 2-3, respectively, are merely illustrative, and different configurations of the modules for implementing the functions described herein are possible in various embodiments.

Figure 4A:
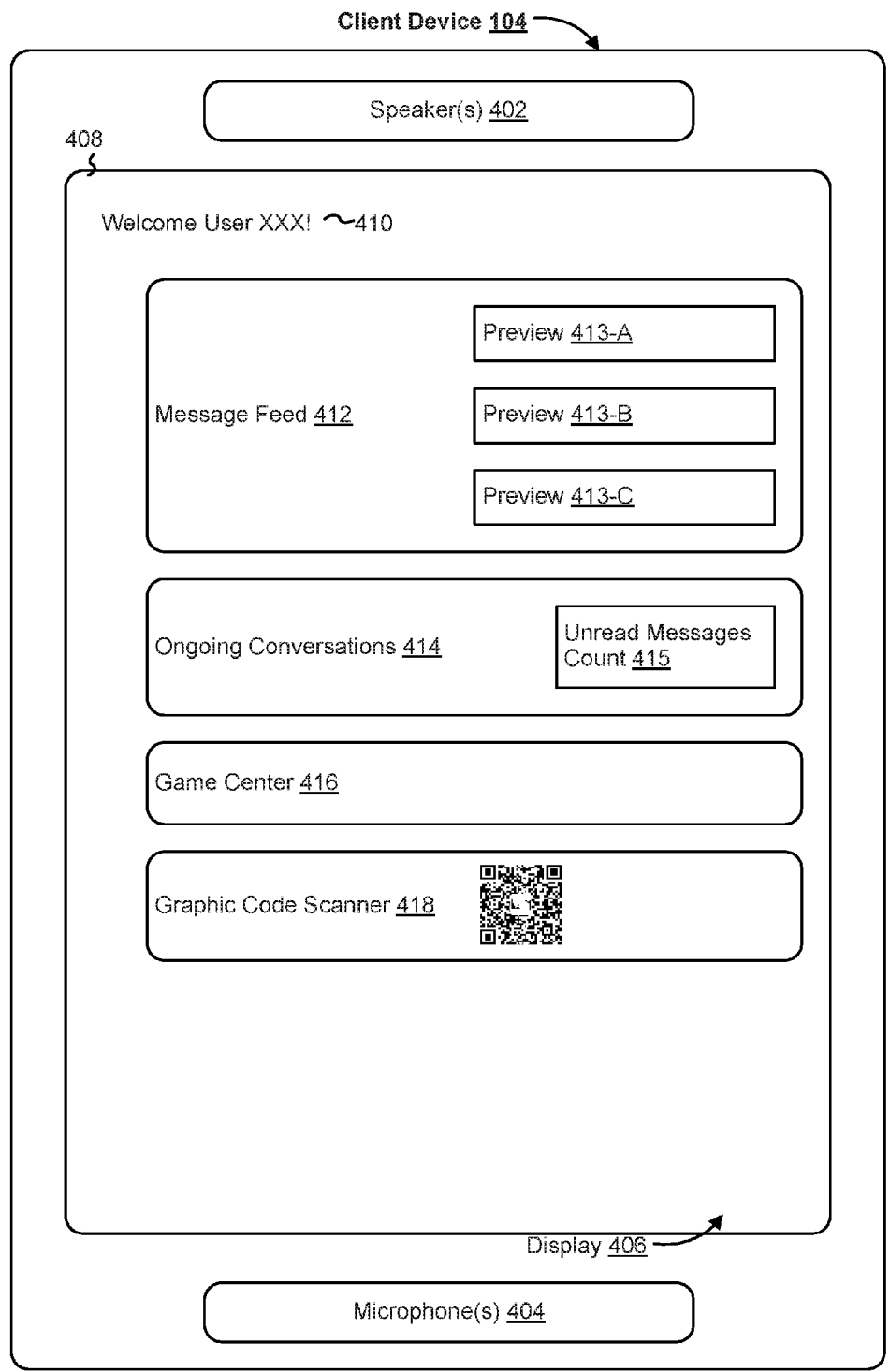
FIGS. 4A-4B illustrate exemplary user interface for facilitating access to the Internet in accordance with some embodiments.
Figure 4B:
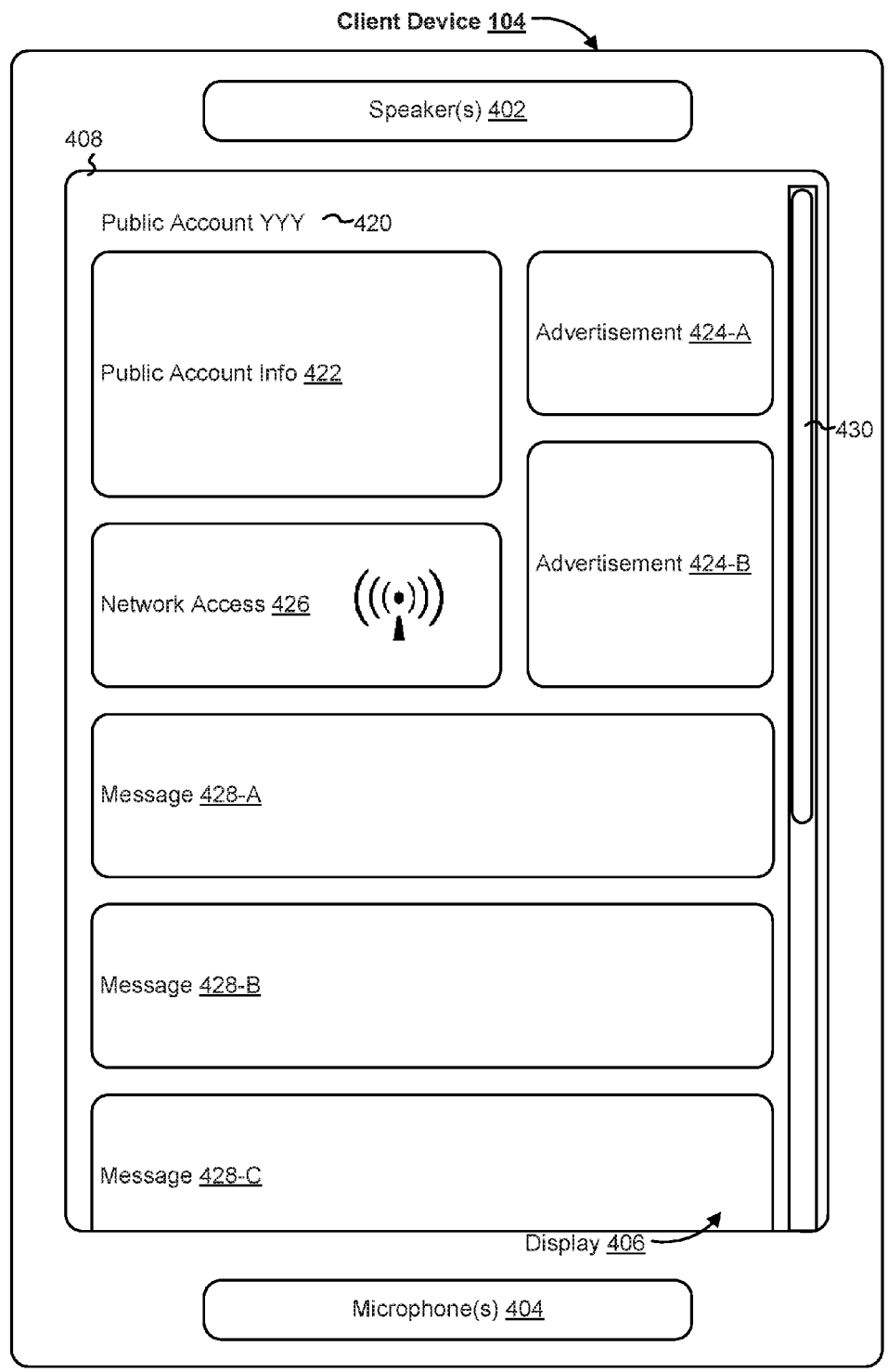

Attention is now directed towards embodiments of user interfaces and associated processes that may be implemented on a client device 104 with zero or more speakers 402, zero or more microphones 404, and a display 406. For example, display 406 is a touch screen (sometimes also herein called a "touch screen display") enabled to receive one or more contacts and display information (e.g., media content, websites and web pages thereof, and/or user interfaces for application(s) 326 or the social networking platform). FIGS. 4A-4B illustrate exemplary user interfaces for facilitating access to the Internet in accordance with some embodiments.

Although some of the examples that follow will be given with reference to inputs on a touch screen (where the touch sensitive surface and the display are combined), in some embodiments, the device detects inputs on a touch-sensitive surface that is separate from the display. In some embodiments, the touch sensitive surface has a primary axis that corresponds to a primary axis on the display. In accordance with these embodiments, the device detects contacts with the touch-sensitive surface at locations that correspond to respective locations on the display. In this way, user inputs detected by the device on the touch-sensitive surface are used by the device to manipulate the user interface on the display of the device when the touch-sensitive surface is separate from the display. It should be understood that similar methods are, optionally, used for other user interfaces described herein.

Additionally, while the following examples are given primarily with reference to contacts (e.g., finger inputs such as finger contacts, finger tap gestures, finger swipe gestures, etc.), it should be understood that, in some embodiments, one or more of the contacts are replaced with input from another input device (e.g., a mouse-based, stylus-based, or physical button-based input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact) or depression of a physical button. Similarly, when multiple user inputs are simultaneously detected, it should be understood that multiple computer mice are, optionally, used simultaneously, or a mouse and finger contacts are, optionally, used simultaneously.

FIGS. 4A-4B show user interface 408 displayed on client device 104 (e.g., a mobile phone); however, one skilled in the art will appreciate that the user interfaces shown in FIGS. 4A-4B may be implemented on other similar computing devices. The user interfaces in FIGS. 4A-4B are used to illustrate the processes described herein, including the methods and processes described with respect to FIGS. 5-7, 8A-8B, and 9A-9B.

FIG. 4A illustrates client device 104 displaying a home interface 410 on display 406. For example, the user of client device 104 executes the social networking platform on client device 104 and enters his/her login credentials to access his/her account for the social networking platform. Home interface 410, for example, is displayed after the login credentials entered by the user of client device 104 are validated. In FIG. 4A, home interface 410 enables the user of client device 104 to access different features of the social networking platform.

In FIG. 4A, home interface 410 includes message feed region 412 whereby the user may access his/her message feed by performing a gesture (e.g., a tap gesture) within message feed region 412. For example, the message feed includes messages sent or posted by public accounts which the user follows within the social network platform and/or all messages sent or posted by the user's contact list (e.g., each contact corresponds to a private account). In FIG. 4A, message feed region 412 includes previews 413-A, 413-B, and 413-C corresponding to a subset of the messages in the user's message feed. In FIG. 4A, home interface 410 also includes ongoing conversations region 414 whereby the user may access recent conversations (e.g., instant messaging conversations) with other users of the social networking platform by performing a gesture (e.g., a tap gesture) within ongoing conversations region 414. In FIG. 4A, ongoing conversations region 414 includes a count of unread messages 415 sent by other users of the social networking platform. In FIG. 4A, home interface 410 further includes game center region 416 for accessing games associated with the social networking platform (e.g., multiplayer games played against other users of the social networking platform) and graphic code scanner affordance 418, which when activated (e.g., by a tap gesture), enables the user of client device 104 to capture an image of a graphic code. For example, a plug-in of the social networking platform extracts information from the graphic code in the captured image that enables the user of client device 104 to access a network access point.

FIG. 4B illustrates client device 104 displaying an interface 420 corresponding to public account YYY on display 406. For example, interface 420 is a profile page corresponding to public account YYY of the social networking platform, where public account YYY is managed/owned by a coffee shop. In FIG. 4B, interface 420 includes public account information 422 corresponding to Public Account YYY such a physical address, operating hours of its coffee shop, phone number, email address, specialty drinks, mission statement, and/or the like. In FIG. 4B, interface 420 also includes advertisements 424-A and 424-B corresponding to Public Account YYY or another product/service based on the likes/dislikes and/or usage history of the user. In FIG. 4B, interface 420 also includes network access affordance 426, which when activated (e.g., with a tap gesture), enables the user of client device 104 to access a network access point provided by Public Account YYY. In FIG. 4B, interface 420 further includes messages 428-A, 428-B, and 429-C posted by Public Account YYY. In FIG. 4B, interface 420 further includes scroll bar 430, which enables the user scroll downwards to view the balances of messages 428.

Figure 5:
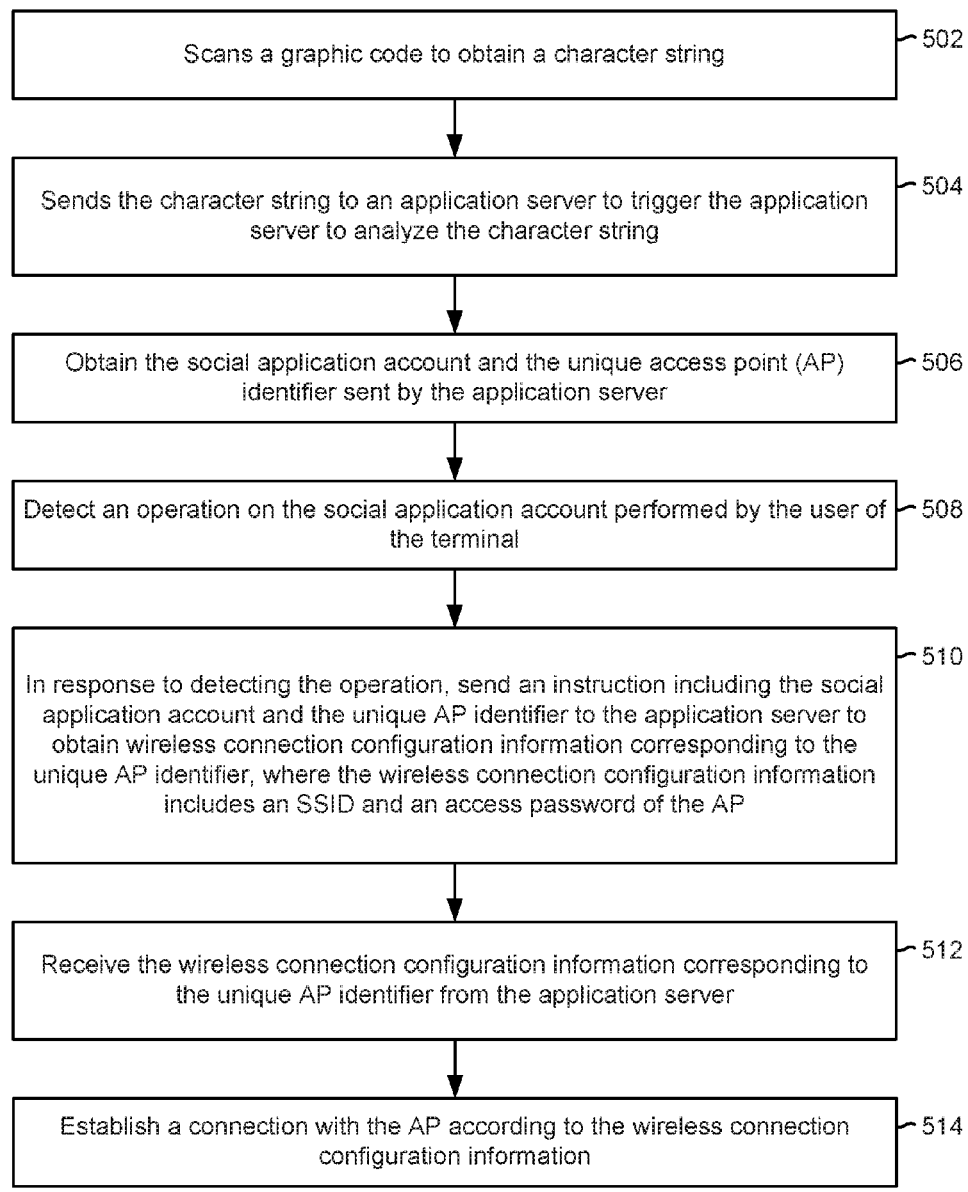
FIG. 5 illustrates a flowchart diagram of a wireless access method in accordance with some embodiments.

FIG. 5 illustrates a flowchart diagram of a wireless access method 500 of in accordance with some embodiments. In some embodiments, method 500 is performed by a terminal with one or more processors and memory. For example, in some embodiments, method 500 is performed by client device 104 (FIGS. 1 and 3) or a component thereof (e.g., client-side module 102, FIGS. 1 and 3). In some embodiments, method 500 is governed by instructions that are stored in a non-transitory computer readable storage medium and the instructions are executed by one or more processors of the terminal.

In some embodiments, data processing for a social networking platform is implemented in client-server environment 100 (FIG. 1) with a server system 108 and client-side module 102 executed on one or more client devices 104. In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3).

The terminal scans (502) a graphic code to obtain a character string. The terminal may be a client in communication equipment, for example, an instant messaging client, a game client, a social application client, an e-mail client, an audio-video client and the like, on which the embodiments of the present application has no limitation. Furthermore, the terminal may be an intelligent apparatus, such as a smartphone, a tablet personal computer, a palm computer, an electronic reader, a remote controller, a PC (Personal Computer), a notebook computer, a vehicle-mounted apparatus, a network television (or IPTV), a wearable apparatus, or the like. The graphic code may a two-dimensional code, a three-dimensional code, or the like. For example, the graphic code is a two-dimensional code in a public place, where not only a social application account is published, but also a wireless access point (such as a Wi-Fi hotspot) is arranged, for example, a hotel, a restaurant, a market, or the like. In some embodiments, a user of the terminal executes a graphic code scanning plug-in in a social application currently running on a terminal, so as to scan the graphic code and obtain a character string. In some embodiments, a user of the terminal executes a graphic code scanning application on a desktop of the terminal, so as to scan the graphic code and obtain a character string.

The terminal sends (504) the character string to an application server to trigger the application server to analyze the character string. In some embodiments, the application server identifies a social application account and a unique wireless access point identifier from the character string. In some embodiments, the terminal sends the character string to an application server corresponding to the social application currently running on it to trigger the application server to analyze the character string and then obtain the social application account and a unique access point (AP) identifier, where the unique AP identifier may include a name of a wireless access point.

The terminal obtains (506) the social application account and the unique access point identifier sent by the application server. In some embodiments, the terminal may display the social application account and the unique AP identifier sent by the application server in a receipt interface after obtaining the social application account and the unique AP identifier sent by the application server.

The terminal detects (508) an operation on the social application account performed by the user of the terminal. For example, the terminal detects a following operation of the social application account. In another example, the terminal detects a selecting operation of an option to obtain network access (such as an option of Wi-Fi access password obtaining) corresponding to the social application account.

In response to detecting the operation, the terminal sends (510) an instruction including the social application account and the unique access point identifier to the application server to trigger the application server to obtain wireless connection configuration information corresponding to the unique access point identifier, where the wireless connection configuration information includes an SSID (Service Set Identifier) and an access password of the access point. In some embodiments, in response to receiving the instruction, the application server sends a wireless connection configuration information request, including the unique access point identifier, to a third-party server corresponding to the social application account. In some embodiments, in response to the wireless connection configuration information request, the third-party server sends the wireless connection configuration information corresponding to the unique access point identifier to the application server. In some embodiments, the terminal send the instruction including the social application account and the unique access point identifier to the application server through the social application currently running on it.

The terminal receives (512) the wireless connection configuration information corresponding to the unique access point identifier from the application server. In some embodiments, the terminal receives the wireless connection configuration information corresponding to the unique AP identifier, which is sent by the application server, through the social application currently running on it. In some embodiments, the wireless connection configuration information corresponding to the unique AP identifier also may include a name, type, encryption method, and/or the like for the wireless access point The terminal establishes (514) a connection with the access point according to the wireless connection configuration information. In some embodiments, the terminal automatically accesses a network (such as a Wi-Fi network) corresponding to the SSID and the access password of the wireless access point, which are included in the wireless connection configuration information, so as to realize a network connection.

According to method 500, the social application account and the wireless access point in the public place is combined, so that the terminal can automatically obtain the SSID and the access password of the wireless access point by scanning the two-dimensional code and then can automatically access to the wireless access point. Therefore, the steps of asking the service staff for a network password and manually inputting the network password are removed from a network access process, resulting in a significant efficient improvement in obtaining wireless access.

It should be understood that the particular order in which the operations in FIG. 5 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 600 and 900, and processes 700 and 800) are also applicable in an analogous manner to method 500 described above with respect to FIG. 5.

Figure 6:
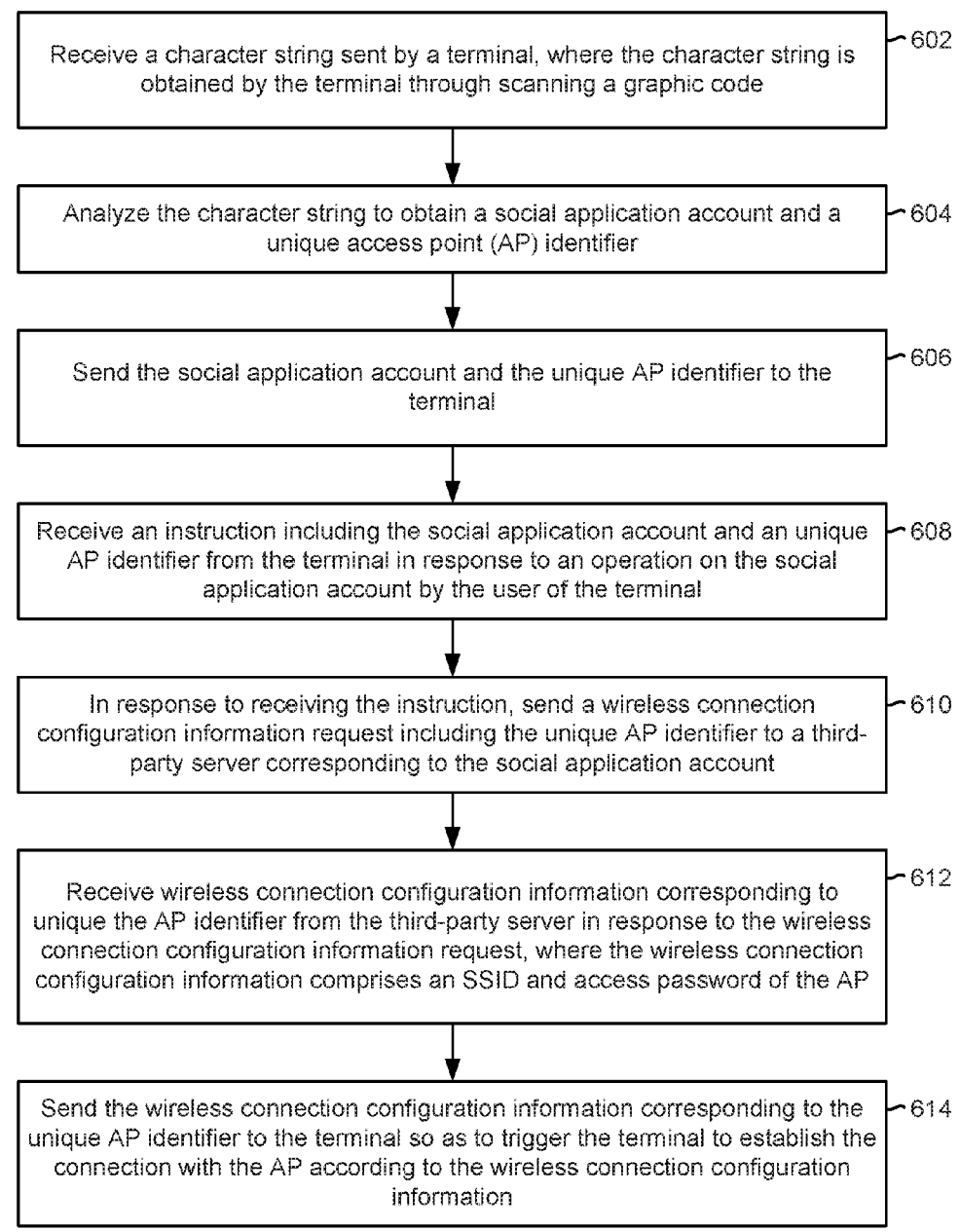
FIG. 6 illustrates a flowchart diagram of a wireless access method in accordance with some embodiments.

FIG. 6 illustrates a flowchart diagram of a wireless access method 600 of in accordance with some embodiments. In some embodiments, method 600 is performed by an application server with one or more processors and memory. For example, in some embodiments, method 600 is performed by server system 108 (FIGS. 1-2) or a component thereof (e.g., server-side module 106, FIGS. 1-2). In some embodiments, method 600 is governed by instructions that are stored in a non-transitory computer readable storage medium and the instructions are executed by one or more processors of the server.

In some embodiments, data processing for a social networking platform is implemented in client-server environment 100 (FIG. 1) with a server system 108 and client-side module 102 executed on one or more client devices 104. In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3).

The application server receives (602) a character string sent by a terminal, where the character string is obtained by the terminal through scanning a graphic code. In some embodiments, the application server receives the character string, which is sent by the terminal through a social application currently running on the terminal.

The application server analyzes (604) the character string to obtain a social application account and a unique access point (AP) identifier. In some embodiments, the unique AP identifier includes a name of the AP.

The application server sends (606) the social application account and the unique AP identifier to the terminal. In some embodiments, the application server may send the social application account and the unique AP identifier to the terminal so as to trigger the terminal to display the social application account and the unique AP identifier through the social application currently running on it.

The application server receives (608) an instruction including the social application account and a unique AP identifier from the terminal in response to an operation on the social application account by the user of the terminal.

In response to receiving the instruction, the application server sends (610) a wireless connection configuration information request including the unique AP identifier to a third-party server corresponding to the social application account.

The application server receives (612) wireless connection configuration information corresponding to the unique AP identifier from the third-party server in response to the wireless connection configuration information request, where the wireless connection configuration information comprises an SSID and access password of the AP. In some embodiments, the wireless connection configuration information corresponding to the unique AP identifier may include a name, type, encryption method, and/or the like of the AP.

The application server sends (614) the wireless connection configuration information corresponding to the unique AP identifier to the terminal so as to trigger the terminal to establish the connection with the AP according to the wireless connection configuration information.

According to method 600, the social application account and the wireless access point in the public place is combined, so that the terminal can automatically obtain the SSID and the access password of the wireless access point by scanning the two-dimensional code and then can automatically access to the wireless access point. Therefore, the steps of asking the service staff for a network password and manually inputting the network password are removed from a network access process, resulting in a significant efficient improvement in obtaining wireless access.

It should be understood that the particular order in which the operations in FIG. 6 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500 and 900, and processes 700 and 800) are also applicable in an analogous manner to method 600 described above with respect to FIG. 6.

Figure 7:
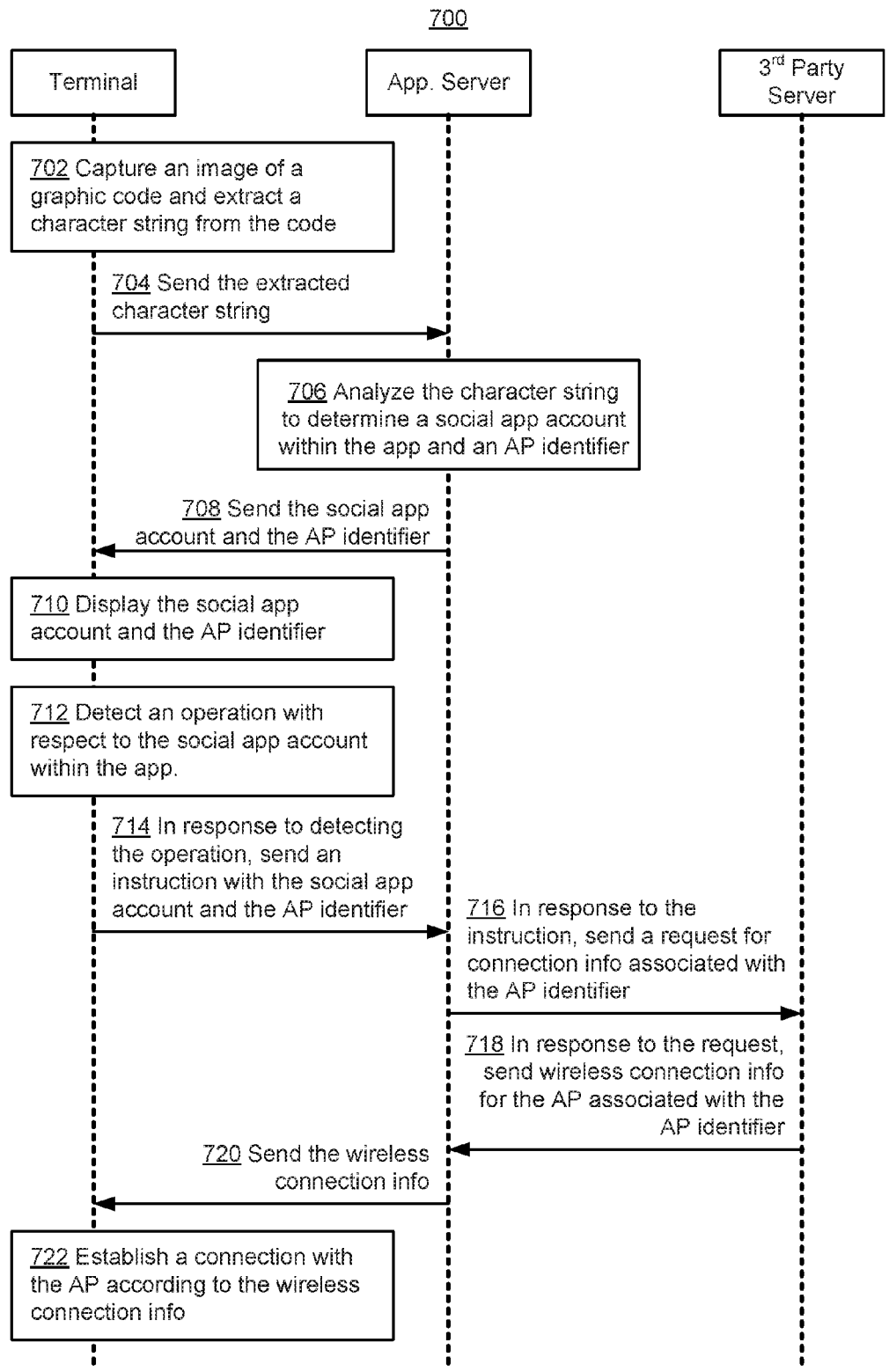
FIG. 7 illustrates a flow diagram of a wireless access process in accordance with some embodiments.

FIG. 7 illustrates a flow diagram of a wireless access process 700 in accordance with some embodiments. In some embodiments, process 700 is performed at least in part by a terminal with one or more processors and memory, an application server with one or more processors and memory, and a third-party server with one or more processors and memory. For example, in some embodiments, process 700 is performed at least in part by client device 104 (FIGS. 1 and 3) or a component thereof (e.g., client-side module 102, FIGS. 1 and 3), server system 108 (FIGS. 1-2) or a component thereof (e.g., server-side module 106, FIGS. 1-2), and a respective third-party server 122.

In some embodiments, data processing for a social networking platform is implemented in client-server environment 100 (FIG. 1) with a server system 108 and client-side module 102 executed on one or more client devices 104. In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3).

The terminal captures (702) an image of a graphic code and extracts a character string from the graphic code. For example, the graphic code is a two-dimensional code in a public place, where not only a social application account is published, but also a wireless access point (such as a Wi-Fi hotspot) is arranged, for example, a hotel, a restaurant, a market, or the like.

The terminal sends (704) the extracted character string to the application server. In some embodiments, the terminal sends the character string to the application server through a social application currently running on it.

The application server analyzes (706) the character string to determine a social application account within the social networking platform (e.g., the application) and a unique access point (AP) identifier. In some embodiments, the unique AP identifier includes a name of a wireless network or access point.

The application server sends (708) the social application account and the unique AP identifier to the terminal.

The terminal receives and displays (710) the social application account and the unique AP identifier.

The terminal detects (712) an operation with respect to the social application account within the social application account performed by the user of the terminal. For example, the terminal detects a following operation of the social application account. In another example, the terminal detects a selecting operation of an option to obtain network access (such as an option of Wi-Fi access password obtaining) corresponding to the social application account.

In response to detecting the operation, the terminal sends (714) an instruction including the social application account and the unique AP identifier to the application server.

In response to receiving the instruction, the application server sends (716) a request for connection information including the unique AP identifier to a third-party server corresponding to the social application account.

In response to the connection information request, the third-party server sends (718) wireless connection information for the access point corresponding to the unique AP identifier to the application server, where the wireless connection information comprises an SSID and access password of the access point.

The application server sends (720) the wireless connection information corresponding to the unique AP identifier to the terminal.

The terminal establishes (722) a connection with the access point according to the wireless connection information.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500, 600, and 900, and process 800) are also applicable in an analogous manner to process 700 described above with respect to FIG. 7.

Figure 8A:
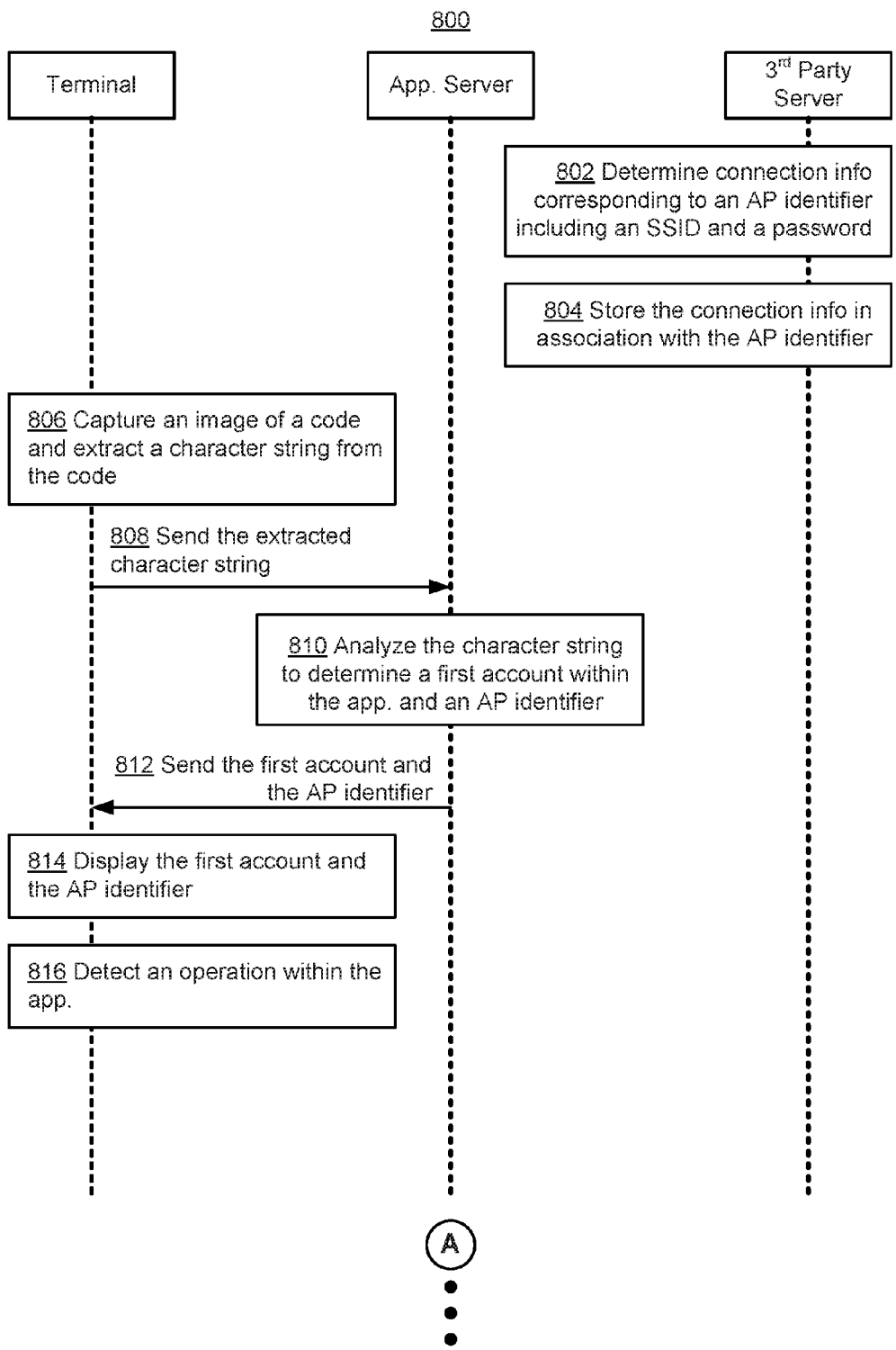
FIGS. 8A-8B illustrate a flow diagram of a wireless access process in accordance with some embodiments.
Figure 8B:
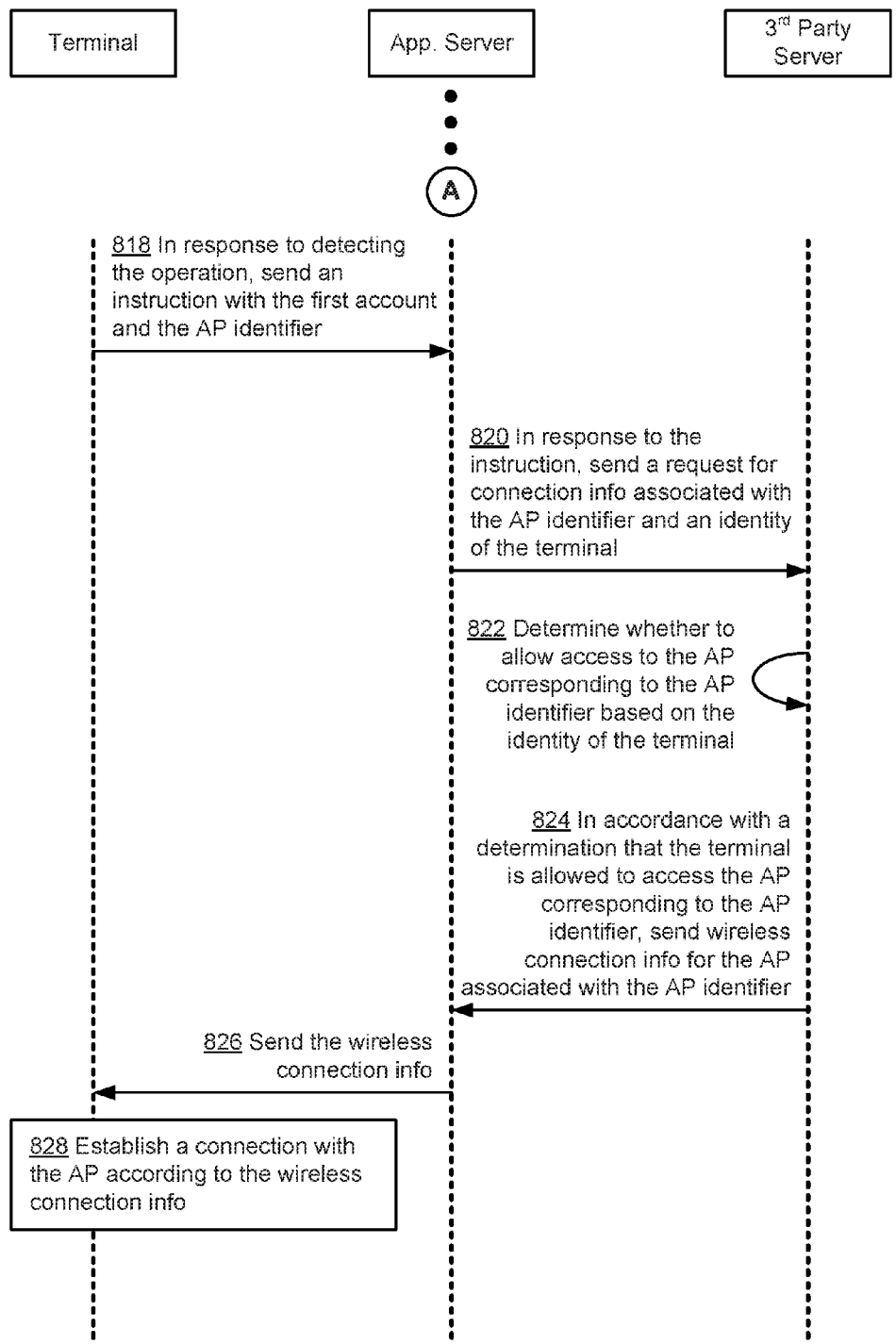

FIGS. 8A-8B illustrate a flow diagram of a wireless access process 800 in accordance with some embodiments. In some embodiments, process 800 is performed at least in part by a terminal with one or more processors and memory, an application server with one or more processors and memory, and a third-party server with one or more processors and memory. For example, in some embodiments, method 800 is performed at least in part by client device 104 (FIGS. 1 and 3) or a component thereof (e.g., client-side module 102, FIGS. 1 and 3), server system 108 (FIGS. 1-2) or a component thereof (e.g., server-side module 106, FIGS. 1-2), and a respective third-party server 122.

In some embodiments, data processing for a social networking platform is implemented in client-server environment 100 (FIG. 1) with a server system 108 and client-side module 102 executed on one or more client devices 104. In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3).

The third-party server determines (802) connection information corresponding to a unique access point (AP) identifier, which includes an SSID and an access password for the AP. In some embodiments, the connection information also includes a name, type, and/or the like for the AP.

The third-party server stores (804) the connection information in association with the unique AP identifier.

The terminal captures (806) an image of a graphic code and extracts a character string from the graphic code. For example, the graphic code is a two-dimensional code in a public place, where not only a social application account is published, but also a wireless access point (such as a Wi-Fi hotspot) is arranged, for example, a hotel, a restaurant, a market, or the like.

The terminal sends (808) the extracted character string to the application server. In some embodiments, the terminal sends the character string to the application server through a social application currently running on it.

The application server analyzes (810) the character string to determine a first social application account within the social networking platform (e.g., the application) and a unique access point (AP) identifier. In some embodiments, the unique AP identifier includes a name of a wireless network or access point.

The application server sends (812) the first social application account and the unique AP identifier to the terminal.

The terminal receives and displays (814) the first social application account and the unique AP identifier.

The terminal detects (816) an operation on the social application account performed by the user of the terminal. For example, the terminal detects a following operation of the social application account. In another example, the terminal detects a selecting operation of an option to obtain network access (such as an option of Wi-Fi access password obtaining) corresponding to the social application account.

In response to detecting the operation, the terminal sends (818) an instruction including the first social application account and the unique AP identifier to the application server.

In response to receiving the instruction, the application server sends (820) a connection information request including the unique AP identifier to a third-party server corresponding to the first social application account and an identity of the terminal. In some embodiments, the identity of the terminal includes a second social application account corresponding to the user of the terminal (and, optionally, corresponding login credentials). In some embodiments, the identity of the terminal includes the mobile phone number corresponding to the terminal or the location of the terminal.

The third-party server determines (822) whether to allow access to the access point corresponding to the unique AP identifier based on the identity of the terminal. In some embodiments, the third-party server determines whether the terminal is allowed to access the AP corresponding to the unique AP identifier based on a list of allowed (or un-allowed) users.

In some embodiments, the third-party server sends a message including the identity of the terminal to an access permission management terminal, where the message is used for querying whether the terminal is allowed to access to the AP corresponding to the unique AP identifier or not. In some embodiments, the access permission management terminal is a smartphone, a tablet personal computer, a palm computer, an MID (Mobile Internet Device) and the like of an administrator associated with the third-party server. In some embodiments, the access permission management terminal displays the message. Subsequently, in some embodiments, the access permission management terminal detects a confirming operation related to the message and sends a response message to the third-party server indicating that the terminal is allowed to access to the AP corresponding to the unique AP identifier. After receiving the response message, the third-party server determines that the terminal is allowed to access the AP corresponding to the unique AP identifier.

Alternatively, in some embodiments, the access permission management terminal detects a denying operation related to the message and sends a response message to the third-party server indicating that the terminal is not allowed to access to the AP corresponding to the unique AP identifier. After receiving the response message, the third-party server determines that the terminal is not allowed to access the AP corresponding to the unique AP identifier.

In accordance with a determination that the terminal is allowed to access the AP corresponding to the unique AP identifier, the third-party server sends (824) sends wireless connection information for the AP corresponding to the unique AP identifier.

The application server sends (826) the wireless connection information corresponding to the unique AP identifier to the terminal.

The terminal establishes (828) a connection with the access point according to the wireless connection information.

It should be understood that the particular order in which the operations in FIGS. 8A-8B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500, 600, and 900, and process 700) are also applicable in an analogous manner to process 800 described above with respect to FIGS. 8A-8B.

Figure 9A:
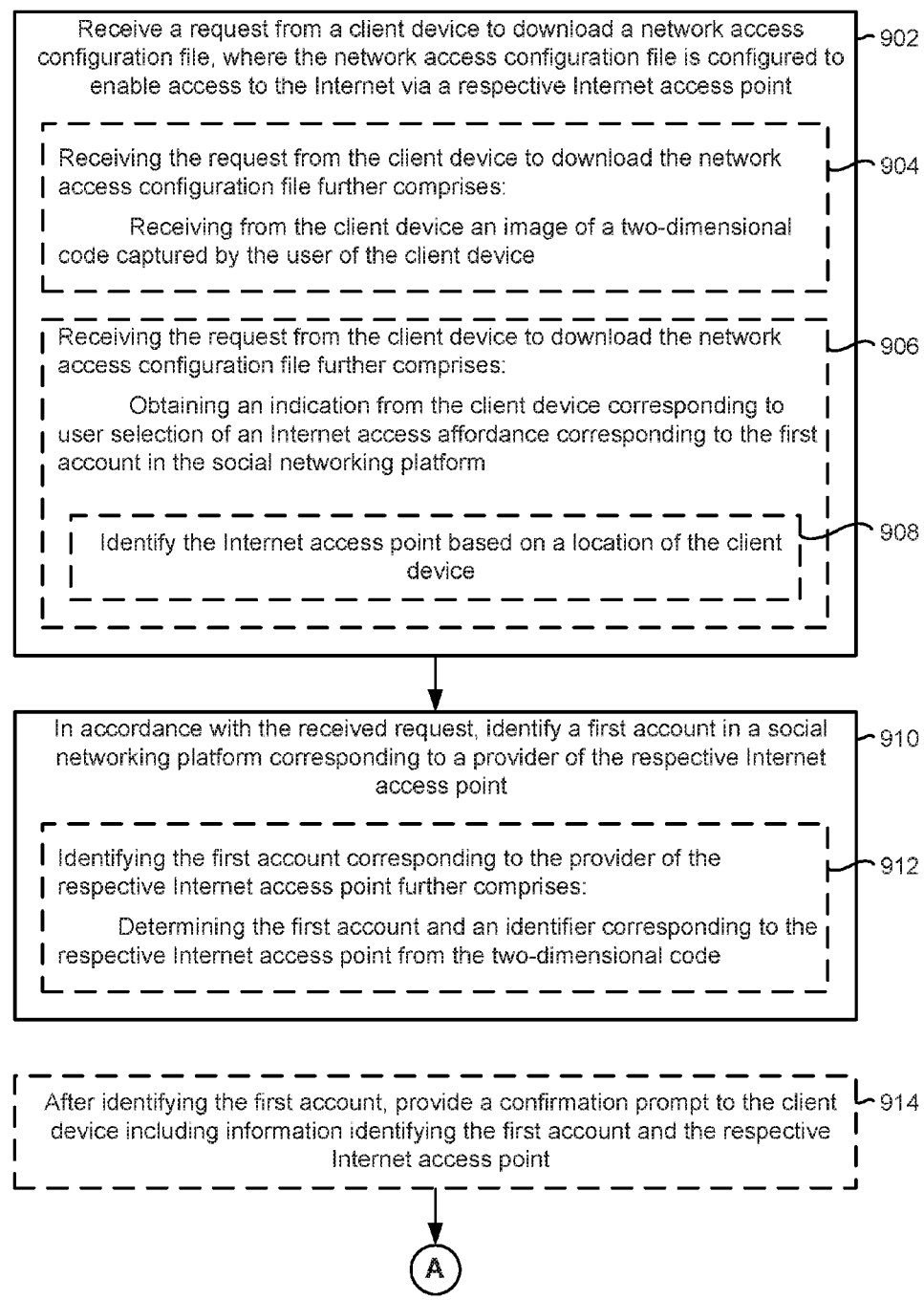
FIGS. 9A-9B illustrate a flowchart diagram of a method of facilitating access to the Internet in accordance with some embodiments.
Figure 9B:
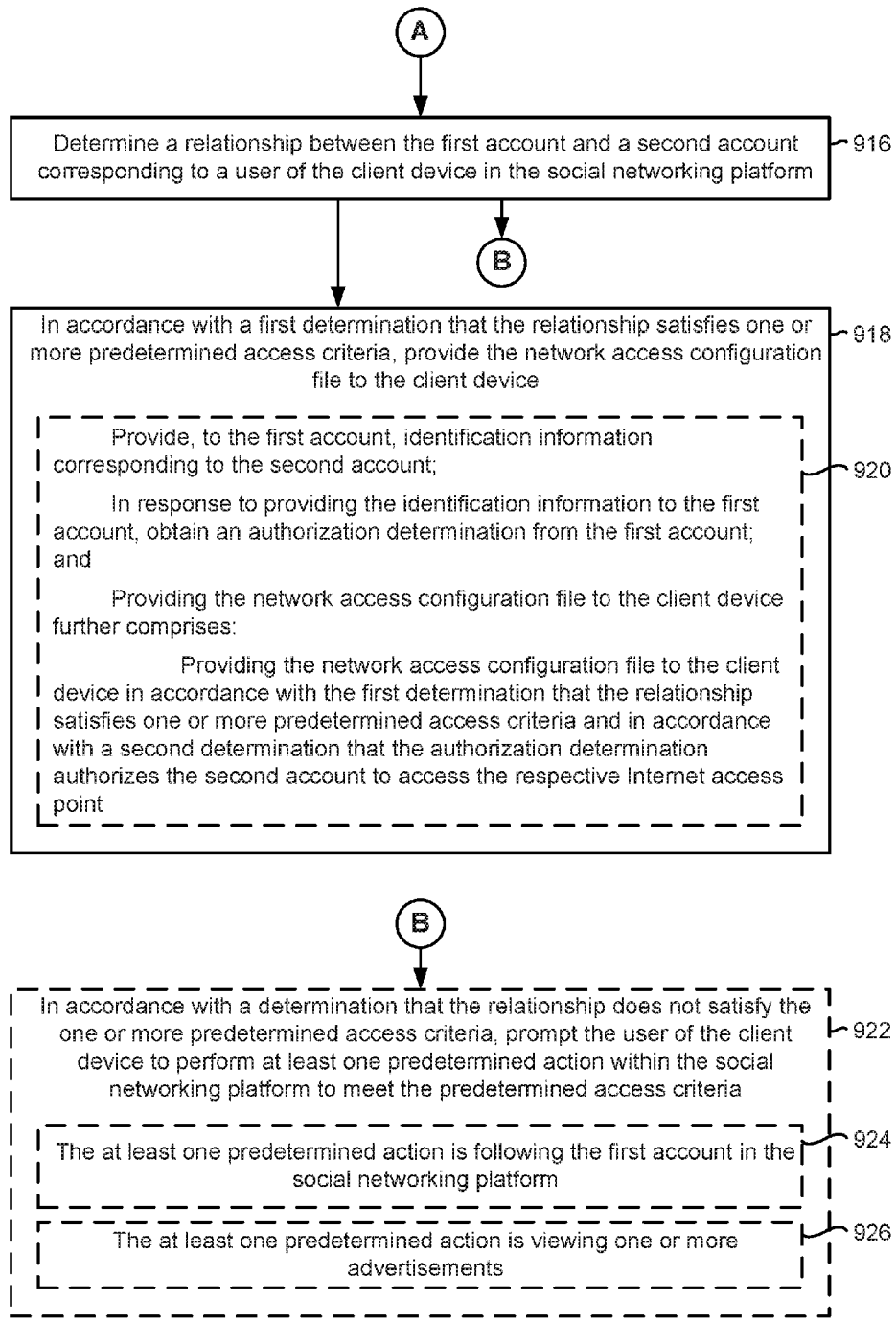

FIGS. 9A-9B illustrate a flowchart diagram of a method 900 of facilitating access to the Internet in accordance with some embodiments. In some embodiments, method 900 is performed by a server with one or more processors and memory. For example, in some embodiments, method 900 is performed by server system 108 (FIGS. 1-2) or a component thereof (e.g., server-side module 106, FIGS. 1-2). In some embodiments, method 900 is governed by instructions that are stored in a non-transitory computer readable storage medium and the instructions are executed by one or more processors of the computing device. Optional operations are indicated by dashed lines (e.g., boxes with dashed-line borders).

In some embodiments, data processing for a social networking platform is implemented in client-server environment 100 (FIG. 1) with a server system 108 and client-side module 102 executed on one or more client devices 104. In some embodiments, server system 108 (FIGS. 1-2) manages and operates the social networking platform. In some embodiments, a respective client-side module 102 (FIGS. 1 and 3) is associated with a user account in the social networking platform that corresponds to a user of client device 104 (FIGS. 1 and 3).

The server receives (902) a request from a client device to download a network access configuration file, where the network access configuration file is configured to enable access to the Internet via a respective Internet access point. In some embodiments, server system 108 or a component thereof (e.g., request handling module 222, FIG. 2) receives a request from a respective client device 104 to download a network access configuration file. For example, the request corresponds to receipt of an image with a graphic code (e.g., a two-dimensional code, QR code, barcode, or the like) scanned by the user of the client device 104. In some embodiments, the graphic code encodes the identity of the provider of the access point (e.g., airport, coffee shop owner, shop owner, etc.) and optionally an identifier of the access point. In another example, the request corresponds to receipt of a notification from client device 104 indicating selection of an affordance within a user interface of the social networking platform and the request includes the identity of the provider of the access point (e.g., airport, coffee shop owner, shop owner, etc.) and optionally an identifier of the access point. In some embodiments, the affordance for requesting the configuration file is associated with a respective provider or sponsor of the access point in the user interface (e.g., if the provider or sponsor has a public account, the affordance can be listed as a service provided or sponsored by the public account). For example, server system 108 may store a list of access points and selects a particular access point for client device 104 when client device 104 is within the range of the access point.

In some embodiments, receiving the request from the client device to download the network access configuration file further comprises (904) receiving from the client device an image of a two-dimensional code captured by the user of the client device. In some embodiments, the request includes an image with a graphic code (e.g., a two-dimensional code, QR code, barcode, or the like) scanned by the user of the client device 104. In some embodiments, server system 108 or a component thereof (e.g., extracting module 224, FIG. 2) decodes the graphic code or extracts an indication of the first user account and the Internet AP from the graphic code. For example, the graphic code may be posted at the location of the network access point in a printed form. Alternatively, the graphic code can be displayed on a website that the user can access using another data channel (e.g., cellular data network). In some embodiments, the code can also be transmitted via a Bluetooth connection to a kiosk, etc. In other words, the graphic code does not have to be an image, it can be an encoded string as well.

In some embodiments, receiving the request from the client device to download the configuration file further comprises (906) obtaining an indication from the client device corresponding to user selection of an Internet access affordance corresponding to the first account in the social networking platform. In some embodiments, the request includes a notification from client device 104 indicating selection of an affordance within a user interface of the social networking platform and the request includes the identity of the provider of the access point (e.g., airport, coffee shop owner, shop owner, etc.) and optionally an identifier of the access point. For example, with reference to FIG. 4B, the user of client device 104 accesses a profile page 420 corresponding to coffee shop (e.g., associated with public account YYY in the social networking platform) and selects "Network Access" affordance 426 on the coffee shop's profile page. In some embodiments, "Network Access" affordance 426 is optionally associated with a particular location of the coffee shop. In some embodiments, server system 108 determines the appropriate access point for client device 104 based on the current location of client device 104.

In some embodiments, the server identifies (908) the Internet access point based on a location of the client device. In some embodiments, the location is determined at the time the indication is received. For example, with reference to FIG. 4B, while in the coffee shop, the user of client device 104 browses to the coffee shop's profile page 420 within the social networking platform and selects the "Network Access" affordance 426. Continuing with this example, in order to determine which access point the user is requesting access to, server system 108 determines the appropriate access point for client device 104 based on the current location of client device 104.

In accordance with the received request, the server identifies (910) a first account in a social networking platform corresponding to a provider of the respective Internet access point. In some embodiments, server system 108 or a component thereof (e.g., account identifying module 226, FIG. 2) identifies a first account in the social networking platform corresponding to a provider of the respective Internet access point. In some embodiments, the first account corresponds to user account within the social networking platform that is either a public account or a private account. For example, a public account is associated with a retail enterprise and may be followed by all users of the social networking platform. For example, a private account is associated with an individual and may only be followed or sent messages upon acceptance of a friendship/contact request.

In some embodiments, identifying the first account corresponding to the provider of the respective Internet access point further comprises (912) determining the first account and an identifier corresponding to the respective Internet access point from the two-dimensional code.

In some embodiments, after identifying the first account, the server provides (914) a confirmation prompt to the client device including information identifying the first account and the respective Internet access point. For example, after sending the scanned graphic code or selecting the "Network Access" affordance, server system 108 provides a prompt, for display within the social networking platform, for the user's confirmation of the identified Internet AP that the user is about to access. For example, if the identified AP included in the prompt does not match the user's current location, the user is able to re-start the process.

The server determines (916) a relationship between the first account and a second account corresponding to a user of the client device in the social networking platform. In some embodiments, server system 108 or a component thereof (e.g., relationship determining module 228, FIG. 2) determines a relationship between the first account and a second account corresponding to a user of respective client device 104 in the social networking platform. For example, relationship determining module 228 determines whether the first account is followed by the second account or, alternatively, whether the first account is on the second account's contact list and vice versa.

In accordance with a first determination that the relationship satisfies one or more predetermined access criteria, the server provides (918) the network access configuration file to the client device. In some embodiments, server system 108 or a component thereof (e.g., requesting module 230, FIG. 2) requests the network access configuration file from a third-party server 122 associated with the first account (i.e., the provider of the Internet access point). In some embodiments, server system 108 identifies the network access configuration file from a database of cached/saved configuration files (e.g., configuration file database 114, FIGS. 1-2). In some embodiments, server system 108 or a component thereof (e.g., providing module 234, FIG. 2) provides the network access configuration file to respective client device 104 in accordance with a first determination that the relationship satisfies one or more predetermined access criteria.

In some embodiments, the server (920): provides, to the first account, identification information corresponding to the second account; and, in response to providing the identification information to the first account, obtains an authorization determination from the first account. In some embodiments, providing the network access configuration file to the client device further comprises providing the network access configuration file to the client device in accordance with the first determination that the relationship satisfies one or more predetermined access criteria and in accordance with a second determination that the authorization determination authorizes the second account to access the respective Internet access point. In some embodiments, server system 108 or a component thereof (e.g., requesting module 230, FIG. 2) requests the network access configuration file from a third-party server 122 associated with the first account (i.e., the provider of the Internet access point), where the request includes identification information corresponding to the second account. In some embodiments, an administrator of third-party server 122 (e.g., who controls/manages the first account) determines whether the second account is allowed or authorized to access the respective Internet access point. In some embodiments, the authorization is not provided back to server system 108, instead, the administrator of third-party server 122 simply uses the control interface of the access point to allow client device 104 to use the respective access point when client device runs the network access configuration file.

In some embodiments, in accordance with a determination that the relationship does not satisfy the one or more predetermined access criteria, the server prompts (922) the user of the client device to perform at least one predetermined action within the social networking platform to meet the predetermined access criteria. In some embodiments, server system 108 or a component thereof (e.g., prompting module 232, FIG. 2) prompts the user of client device 104 to perform at least one predetermined action within the social networking platform in accordance with a determination that the relationship does not satisfy the one or more predetermined access criteria. For example, the relationship does not satisfy the one or more predetermined access criteria when the second account associated with the user of client device 104 does not follow the first account or has not established the first account as a contact within the social networking platform.

In some embodiments, the at least one predetermined action is (924) following the first account in the social networking platform. For example, the least one predetermined action prompts the user of client device 104 to follow the first account within the social networking platform so as to establish a relationship between the second account associated with the user of client device 104 and the first account.

In some embodiments, the at least one predetermined action is (926) viewing one or more advertisements. For example, the least one predetermined action prompts the user of client device 104 to watch or view one or more advertisements (e.g., advertisements corresponding to the first account or another product/service based on the likes/dislikes and/or usage history of the user of client device 104). For example, to bypass the criteria, the user of client device 104 can choose to pay the first account or buy a product at a location or online marketplace associated with the first account.

In some embodiments, the user can access a higher Internet tier (e.g., with faster connectivity or greater bandwidth) by viewing additional advertisements or commenting/tweeting about the provider of the respective access point. In some embodiments, if multiple access points are available, server system 108 suggests one with the greatest available bandwidth or ranks them according to predefined criteria for the user of client device 104 to choose from. For example, server system 108 knows that the coffee shop at which the user is located has 3 access points and proposes that the user access the least used access point based on historic data or recommend that the user watch advertisements to access a higher Internet tier based on current bandwidth availability. In some embodiments, a user may share a network access configuration file with a friend or contact over the social networking platform. In some embodiments, the additional step in operation 920 of requiring authorization third-party server 122 prevents sharing of network access configuration files. As such, the provider of the access point can choose which mode of operation that works best for it.

It should be understood that the particular order in which the operations in FIGS. 9A-9B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 500 and 600, and processes 700 and 800) are also applicable in an analogous manner to method 900 described above with respect to FIGS. 9A-9B.

Figure 10A:
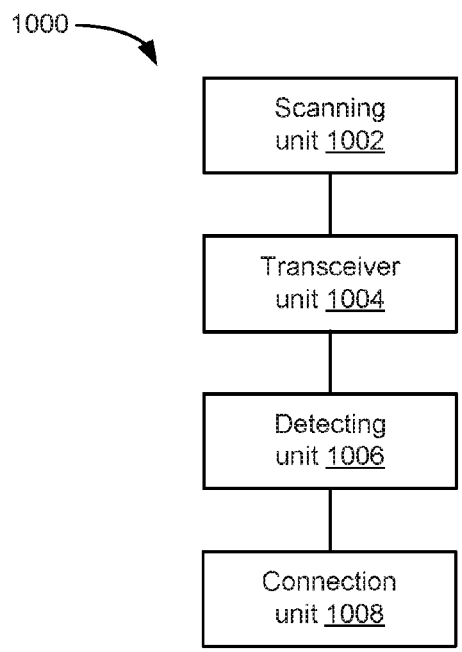
FIG. 10A is a block diagram of a client-side apparatus for providing wireless access in accordance with some embodiments.

FIG. 10A is a block diagram of a client-side apparatus 1000 for providing wireless access in accordance with some embodiments. In some embodiments, client-side apparatus 1000 may be implemented in whole or in part by software, hardware, or a combination thereof. For example, client-side apparatus 1000 corresponds to client device 104 (FIGS. 1 and 3) or a component thereof (e.g., client-side module 102, FIGS. 1 and 3). In some embodiments, client-side apparatus 1000 includes: scanning unit 1002, transceiver unit 1004, detecting unit 1006, and connection unit 1008.

In some embodiments, scanning unit 1002 is configured to capture an image of a graphic code and extract a character string from the graphic code.

In some embodiments, transceiver unit 1004 is configured to send the extracted character string to server-side apparatus 1050 (FIG. 10B) and receive a social application account and the unique AP identifier.

In some embodiments, detecting unit 1006 is configured to detect an operation on the social application account performed by the user of client-side apparatus 1000.

In some embodiments, transceiver unit 1004 is further configured to send to server-side apparatus 1050 an instruction including the social application account and the unique AP identifier to the application server in response to detecting unit 1006 detecting the operation. In some embodiments, transceiver unit 1004 is further configured to receive wireless connection information corresponding to the unique AP identifier from server-side apparatus 1050.

In some embodiments, connection unit 1008 is configured to establish a connection with the access point according to the wireless connection information.

Figure 10B:
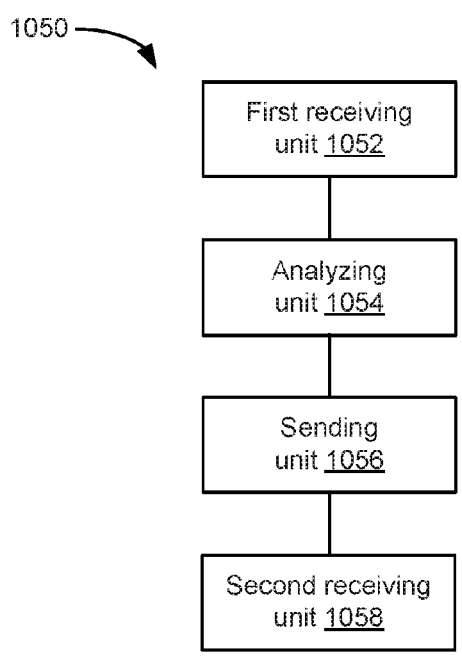
FIG. 10B is a block diagram of a server-side apparatus for providing wireless access in accordance with some embodiments.

FIG. 10B is a block diagram of a server-side apparatus 1050 for providing wireless access in accordance with some embodiments. In some embodiments, server-side apparatus 1050 may be implemented in whole or in part by software, hardware, or a combination thereof. For example, server-side apparatus 1050 corresponds to server system 108 (FIGS. 1-2) or a component thereof (e.g., server-side module 106, FIGS. 1-2). In some embodiments, server-side apparatus 1050 includes: first receiving unit 1052, analyzing unit 1054, sending unit 1056, and second receiving unit 1058.

In some embodiments, first receiving unit 1052 is configured to receive the extracted character string from client-side apparatus 1000 (FIG. 10A).

In some embodiments, analyzing unit 1054 is configured to analyze the character string received by first receiving unit 1052 to determine a social application account within the social networking platform and a unique access point (AP) identifier.

In some embodiments, sending unit 1056 is configured to send the social application account and the unique AP identifier determined by analyzing unit 1054 to client-side apparatus 1000.

In some embodiments, first receiving unit 1052 is further configured to receive an instruction including the social application account and the unique AP identifier from client-side apparatus 1000.

In some embodiments, sending unit 1056 is further configured to send a connection information request including the unique AP identifier to a third-party server corresponding to the social application account.

In some embodiments, second receiving unit 1058 is configured to receive, from the third-party server, wireless connection information for the access point corresponding to the unique AP identifier to the application server, where the wireless connection information comprises an SSID and access password of the access point.

In some embodiments, sending unit 1056 is further configured to send the wireless connection information received by second receiving unit 1058 to client-side apparatus 1000.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of facilitating access to the Internet, comprising:

receiving, by an application server corresponding to a social networking platform, a request directly from a client device to access an Internet access point, wherein an application on the client device is logged in to the social networking platform with a second account of a user;

in accordance with the received request, identifying, by the application server, a first account in the social networking platform corresponding to a provider of the Internet access point;

determining, by the application server, a relationship between the first account of the provider and the second account of the user of the client device in the social networking platform; and in accordance with a determination that the determined relationship satisfies one or more predetermined access criteria, sending, by the application server, a network access configuration file to the client device, wherein the network access configuration file is configured to be parsed by the client device to gain access to the Internet access point, and the network access configuration file includes an access password of the Internet access point, wherein sending the network configuration file to the client device comprises:

determining, by the application server, among a plurality of third-party servers, a third-party server corresponding to the provider of the Internet access point based on the first account in the social networking platform, wherein the plurality of third-party servers are each associated with a public account and provide Internet access points at different physical locations;

sending, by the application server, a wireless connection configuration information request to the third-party server corresponding to the provider of the Internet access point, the wireless connection configuration information request including a unique identifier of the Internet access point;

receiving, by the application server, wireless connection configuration information corresponding to the unique AP identifier from the third-party server; and sending the network configuration file to the client device, the network access configuration file including the wireless connection configuration information received from the third-party server.

2. The method of claim 1, wherein:

the receiving the request from the client device comprises:

receiving, by the application server from the client device, information extracted from an image of a two-dimensional code captured by the client device, the two-dimensional code corresponding to the provider of the Internet access point; and the identifying the first account in the social networking platform corresponding to the provider of the respective Internet access point comprises:

determining the first account and an identifier corresponding to the respective Internet access point from the information extracted from the two-dimensional code.

3. The method of claim 2, further comprising:
after identifying the first account, providing a confirmation prompt to the client device including information identifying the first account and the Internet access point.

4. The method of claim 1, wherein the receiving the request from the client device comprises:
obtaining, by the application server, an indication from the client device corresponding to user selection of an Internet access affordance corresponding to the first account in the social networking platform, the user selection being generated on a graphical user interface of the application on the client device displaying a profile page of the first account of the provider.

5. The method of claim 4, further comprising:
identifying the Internet access point based on a location of the client device.

6. The method of claim 1, further comprising:
in accordance with a determination that the determined relationship does not satisfy the one or more predetermined access criteria, prompting the client device to perform at least one predetermined user action within the social networking platform to meet the one or more predetermined access criteria.

7. The method of claim 6, wherein:
the one or more predetermined access criteria includes the second account of the user of the client device following the first account of the provider of the Internet access point in the social networking platform, or the second account establishing the first account as a contact within the social networking platform.

8. The method of claim 6, wherein the at least one predetermined user action includes at least one of:
following, by the second account of the user, the first account of the provider of the Internet access point within the social networking platform;
viewing, by the second account of the user, one or more advertisements; or
paying, by the second account of the user, the first account of the provider of the Internet access point.

9. The method of claim 1, further comprising:
providing, by the application server to a computing terminal corresponding to the first account of the provider, identification information corresponding to the second account of the user; and
in response to providing the identification information of the second account to the computing terminal corresponding to the first account, obtaining an authorization determination from the computing terminal corresponding to the first account,
wherein the sending the network access configuration file to the client device comprises:
sending the network access configuration file to the client device in accordance with the determination that the determined relationship satisfies the one or more predetermined access criteria and in accordance with a determination that the obtained authorization determination authorizes the second account to access the Internet access point.

10. The method of claim 1, further comprising:
providing the second account of the user with an option to access an advanced Internet tier by viewing additional advertisements or commenting about the provider of the Internet access point, wherein the advanced Internet tier has faster connectivity or greater bandwidth than the access granted in response to the determination that the determined relationship satisfies the one or more predetermined access criteria.

11. An application server, comprising:
at least one processor; and
at least one memory storing instructions that, when executed by the at least one processor, cause the following to be performed:
receiving a request directly from a client device to access an Internet access point, wherein the application server is a server of a social networking platform, and an application on the client device is logged in to the social networking platform with a second account of a user;
in accordance with the received request, identifying a first account in the social networking platform corresponding to a provider of the Internet access point;
determining a relationship between the identified first account of the provider and the second account of the user of the client device in the social networking platform; and
in accordance with a determination that the determined relationship satisfies one or more predetermined access criteria, sending a network access configuration file to the client device, wherein the network access configuration file is configured to be parsed by the client device to gain access to the Internet access point, and the network access configuration file includes an access password of the Internet access point,
wherein sending the network configuration file to the client device comprises:
determining, by the application server, among a plurality of third-party servers, a third-party server corresponding to the provider of the Internet access point based on the first account in the social networking platform, wherein the plurality of third-party servers are each associated with a public account and provide Internet access points at different physical locations;
sending, by the application server, a wireless connection configuration information request to the third-party server corresponding to the provider of the Internet access point, the wireless connection configuration information request including a unique identifier of the Internet access point;
receiving, by the application server, wireless connection configuration information corresponding to the unique AP identifier from the third-party server; and
sending the network configuration file to the client device, the network access configuration file including the wireless connection configuration information received from the third-party server.

12. The application server of claim 11, wherein:
the receiving the request from the client device to download the network access configuration file comprises:
receiving from the client device information extracted from an image of a two-dimensional code captured by the client device, the two-dimensional code corresponding to the provider of the Internet access point; and
the identifying the first account in the social networking platform corresponding to the provider of the respective Internet access point comprises:

determining the first account and an identifier corresponding to the respective Internet access point from the information extracted from the two-dimensional code.

13. The application server of claim 12, wherein the instructions, when executed by the at least one processor, further cause the following to be performed:
after identifying the first account, providing a confirmation prompt to the client device including information identifying the first account and the Internet access point.

14. The application server of claim 11, wherein the receiving the request from the client device comprises:
obtaining an indication from the client device corresponding to user selection of an Internet access affordance corresponding to the first account in the social networking platform, the user selection being generated on a graphical user interface of the application on the client device displaying a profile page of the first account of the provider.

15. The application server of claim 14, wherein the instructions, when executed by the at least one processor, further cause the following to be performed:
identifying the Internet access point based on a location of the client device.

16. The application server of claim 11, wherein the instructions, when executed by the at least one processor, further cause the following to be performed:
in accordance with a determination that the determined relationship does not satisfy the one or more predetermined access criteria, prompting the client device to perform at least one predetermined user action within the social networking platform to meet the one or more predetermined access criteria.

17. The application server of claim 11, wherein the instructions, when executed by the at least one processor, further cause the following to be performed:
providing, to a computing terminal corresponding to the first account of the provider, identification information corresponding to the second account of the user, and
in response to the providing of the identification information of the second account to the computing terminal corresponding to the first account, obtaining an authorization determination from the computing terminal corresponding to the first account; and
the sending the network access configuration file to the client device comprises:
sending the network access configuration file to the client device in accordance with the determination that the determined relationship satisfies the one or more predetermined access criteria and in accordance with a determination that the obtained authorization determination authorizes the second account to access the Internet access point.

18. A non-transitory computer readable storage medium storing instructions, which, when executed by an application server including at least one processor, cause the application server to perform operations comprising:
receiving a request directly from a client device to access an Internet access point, wherein the application server is a server of a social networking platform, and an application on the client device is logged in to the social networking platform with a second account of a user;
in accordance with the received request, identifying the first account in a social networking platform corresponding to a provider of the Internet access point;
determining a relationship between the first account of the provider and the second account of the user of the client device in the social networking platform; and
in accordance with a determination that the determined relationship satisfies one or more predetermined access criteria, sending a network access configuration file to the client device, wherein the network access configuration file is configured to be parsed by the client device to gain access to the Internet access point, and the network access configuration file includes an access password of the Internet access point,
wherein sending the network configuration file to the client device comprises:
determining, by the application server, among a plurality of third-party servers, a third-party server corresponding to the provider of the Internet access point based on the first account in the social networking platform, wherein the plurality of third-party servers are each associated with a public account and provide Internet access points at different physical locations;
sending, by the application server, a wireless connection configuration information request to the third-party server corresponding to the provider of the Internet access point, the wireless connection configuration information request including a unique identifier of the Internet access point;
receiving, by the application server, wireless connection configuration information corresponding to the unique AP identifier from the third-party server; and
sending the network configuration file to the client device, the network access configuration file including the wireless connection configuration information received from the third-party server.

19. The non-transitory computer readable storage medium of claim 18, wherein:
the receiving the request from the client device to download the network access configuration file comprises:
receiving from the client device information extracted from an image of a two-dimensional code captured by the client device, the two-dimensional code corresponding to the provider of the Internet access point; and
the identifying the first account in the social networking platform corresponding to the provider of the respective Internet access point comprises:
determining the first account and an identifier corresponding to the respective Internet access point from the information extracted from the two-dimensional code.

20. The non-transitory computer readable storage medium of claim 18, wherein the receiving the request from the client device comprises:
obtaining an indication from the client device corresponding to user selection of an Internet access affordance corresponding to the first account in the social networking platform, the user selection being generated on a graphical user interface of the application on the client device displaying a profile page of the first account of the provider.

* * * * *